United States Patent
Ko

(10) Patent No.: US 10,434,892 B2
(45) Date of Patent: Oct. 8, 2019

(54) SYSTEM AND METHOD FOR MANAGING BATTERY FOR VEHICLE, AND VEHICLE THEREOF

(71) Applicants: Hyundai Motor Company, Seoul (KR); Kia Motors Corporation, Seoul (KR)

(72) Inventor: KyuBeom Ko, Bupyeong-gu (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 107 days.

(21) Appl. No.: 15/663,731

(22) Filed: Jul. 29, 2017

(65) Prior Publication Data
US 2018/0170207 A1 Jun. 21, 2018

(30) Foreign Application Priority Data
Dec. 20, 2016 (KR) .................. 10-2016-0174488

(51) Int. Cl.
*H01M 10/44* (2006.01)
*H02J 7/10* (2006.01)
(Continued)

(52) U.S. Cl.
CPC .......... *B60L 11/1874* (2013.01); *B60L 53/60* (2019.02); *B60L 58/10* (2019.02); *B60L 58/26* (2019.02);
(Continued)

(58) Field of Classification Search
CPC ... B60L 11/18; B60L 11/1809; B60L 11/1811; B60L 11/1824; B60L 11/1874;
(Continued)

(56) References Cited

U.S. PATENT DOCUMENTS 7,564,213 B2* 7/2009 Bockelmann ......... B60L 3/0046
320/104
8,148,951 B2* 4/2012 Saito ....................... H02J 7/14
320/155
(Continued)

FOREIGN PATENT DOCUMENTS

JP 2011055620 A 3/2011
JP 2015070722 A 4/2015
JP 2015208225 A 11/2015

OTHER PUBLICATIONS

Belt J., et al., "Calendar and PHEV cycle life aging of high-energy, lithium-ion cells containing blended spinel and layered-oxide cathodes," Journal of Power Sources, 196(2011) 10213-10221, Dec. 2011, 9 pages.
(Continued)

*Primary Examiner* — Fritz M Fleming
*Assistant Examiner* — Jagdeep S Dhillon
(74) *Attorney, Agent, or Firm* — Slater Matsil, LLP

(57) ABSTRACT

Disclosed herein are a system and method for managing a battery for vehicle and vehicle thereof. A power network server includes a controller and a memory storing a program to be executed in the controller. The program includes instructions for collecting information about energy consumption of the battery and information about a vehicle state from the vehicle, converting an ambient temperature based energy consumption to a reference temperature based learned energy consumption, calculating a charging or discharging amount of energy by reflecting the current ambient temperature based on the converted learned energy consumption, setting a range of charging or discharging current based on the charging or discharging amount of energy and an extra amount of energy, and managing the battery based on the set range of charging or discharging current.

20 Claims, 14 Drawing Sheets

(51) Int. Cl.
  *H01M 10/48*     (2006.01)
  *H01M 10/613*    (2014.01)
  *B60L 11/18*     (2006.01)
  *H02J 7/00*      (2006.01)
  *H01M 10/625*    (2014.01)
  *H01M 10/6563*   (2014.01)
  *H01M 10/6568*   (2014.01)
  *B60L 53/60*     (2019.01)
  *B60L 58/10*     (2019.01)
  *B60L 58/26*     (2019.01)
  *H01M 10/42*     (2006.01)

(52) U.S. Cl.
  CPC ....... *H01M 10/443* (2013.01); *H01M 10/486* (2013.01); *H01M 10/613* (2015.04); *H01M 10/625* (2015.04); *H01M 10/6563* (2015.04); *H01M 10/6568* (2015.04); *H02J 7/008* (2013.01); *H02J 7/0029* (2013.01); *H02J 7/0063* (2013.01); *H02J 7/0091* (2013.01); *B60L 2240/545* (2013.01); *B60L 2240/662* (2013.01); *H01M 2010/4278* (2013.01); *H01M 2220/20* (2013.01); *H02J 2007/0067* (2013.01); *H02J 2007/0096* (2013.01)

(58) Field of Classification Search
  CPC ....... B60L 1/003; H02J 7/0029; H02J 7/0091; H02J 7/0063; H01M 10/443; H01M 10/613; H01M 10/625; H01M 10/6563; H01M 10/6568; H01M 10/486
  USPC ........ 307/9.1, 10.1, 10.7, 31, 64, 66, 80, 82; 320/109, 108, 119
  See application file for complete search history.

(56) References Cited

U.S. PATENT DOCUMENTS

| | | | |
|---|---|---|---|
| 8,519,674 B2 | 8/2013 | Anderson et al. | |
| 2006/0238203 A1* | 10/2006 | Kelley | G01R 31/389 324/433 |
| 2010/0010704 A1* | 1/2010 | Uchida | B60L 3/0046 701/29.6 |
| 2013/0307476 A1* | 11/2013 | Darragh | B60L 3/00 320/109 |
| 2014/0129829 A1* | 5/2014 | Unagami | H04L 9/3268 713/158 |
| 2015/0070024 A1 | 3/2015 | Kim et al. | |
| 2015/0283915 A1* | 10/2015 | Kim | B60L 58/27 320/104 |
| 2016/0082860 A1* | 3/2016 | Marchal | B60L 58/12 320/136 |
| 2016/0126756 A1* | 5/2016 | Okubo | H02J 7/0045 320/107 |
| 2016/0149418 A1* | 5/2016 | Jung | H02J 7/0091 320/107 |
| 2016/0159236 A1* | 6/2016 | Tagome | H01M 10/48 320/109 |
| 2016/0229282 A1* | 8/2016 | Hettrich | B60L 58/24 |
| 2017/0088006 A1* | 3/2017 | Blatchley | B60H 1/00278 |
| 2017/0274794 A1* | 9/2017 | Tenmyo | B60L 58/10 |

OTHER PUBLICATIONS

Green Car Reports, "Nissan Leaf, Chevy Volt Range Loss in Winter: New Data From Canada," www.greencareports.comnews1089160_nissan-leaf-chevy-volt-range-loss-in-winter-new-data-from-canada, Dec. 17, 2013, 4 pages.

Won, Il-Kuen, et al., "The Prediction of Total Revenue of V2G System Considering Battery Wear Cost," Journal of the Korean Institute of Illuminating and Electrical installation Engineers, (2015) 29(4), pp. 85-94.

* cited by examiner

SYSTEM AND METHOD FOR MANAGING BATTERY FOR VEHICLE, AND VEHICLE THEREOF

CROSS-REFERENCE TO RELATED APPLICATIONS

This application claims priority to and the benefit of Korean Patent Application No. 10-2016-0174488, filed on Dec. 20, 2016, the disclosures of which is incorporated herein by reference in its entirety.

TECHNICAL FIELD

The present disclosure relates to a system and method for managing a battery for vehicle and vehicle thereof.

BACKGROUND

A smart grid is the next generation power network, which combines an information technology (IT) to a power network and optimizes energy efficiency through real time information exchange between the provider of electricity and the user, thereby bringing new added value.

Today, many different methods for applying the smart grid technology to vehicles are being sought.

As demands for electric vehicles (EVs) are rising, service operators have started to study a method for efficiently charging the EVs battery, slowing down degradation of the battery, and using the electricity charged in the battery for some other purposes.

SUMMARY

The present disclosure provides a system and method for managing a battery for vehicle and vehicle thereof, by which electricity in the battery may be used in various ways and degradation of the battery is slowed down through charging and discharging management of the battery.

In accordance with one aspect of the present disclosure, a system for managing a battery for vehicle, includes a power network server configured to collect information about energy consumption of the battery and information about a vehicle state from the vehicle, convert an ambient temperature based energy consumption to a reference temperature based learned energy consumption, calculate a charging or discharging amount of energy by reflecting the current ambient temperature based on the converted learned energy consumption, set a range of charging or discharging current based on the charging or discharging amount of energy and an extra amount of energy, and manage the battery based on the set range of charging or discharging current.

The power network server may be set a difference in energy between a current charging level (state of charge) and a charging level at a point of charging completion time as a charging amount for the battery.

The power network server may be perform charging the battery according to the charging amount and based on a charging current rate of the following equation 1.

$$\text{charging current rate (kW)} = (\text{energy at charging level at charging completion point of time (kWh)} - \text{reserved energy at the current charging level (kWh)})/\text{minimum power rate period of time (hour)} \quad (1)$$

The power network server may perform charging of the battery based on the charging current rate, wherein the charging current rate is changed based on temperature of the battery.

The power network server may be set a difference in energy between a current charging level and a charging level at a point of discharging completion time as a discharging amount for the battery.

The power network server may perform discharging the battery according to the discharging amount and based on a discharging current rate of the following equation 2.

$$\text{discharging current rate (kW)} = (\text{reserved energy at current charging level (kWh)} - \text{energy at charging level at discharging completion point of time (kWh)})/\text{maximum power rate period of time (hour)} \quad (2)$$

The power network server may perform discharging of the battery based on the discharging current rate, wherein the discharging current rate is changed based on temperature of the battery.

The power network server may control temperature of the battery of the vehicle to be increased or decreased by comparing the temperature of the battery with at least one of a reference temperature and an ambient temperature while the battery is left alone.

The system for managing a battery for vehicle may further includes a vehicle configured to send information about energy consumption of the battery and a state of the vehicle to the power network server, and control operation of a corresponding component equipped in the vehicle according to a control signal for the battery sent from the power network server.

In accordance with one aspect of the present disclosure, a method for managing a battery for vehicle, includes collecting information about energy consumption of a battery of a vehicle and information about a vehicle state; converting ambient temperature based energy consumption to reference temperature based learned energy consumption; calculating current ambient temperature based charging or discharging amount of energy based on the converted learned energy consumption; setting a range of charging or discharging current based on the charging or discharging amount of energy and an extra amount of energy; and managing the battery based on the set range of charging or discharging current.

The method managing the battery may further include for battery charging management, setting a difference in energy between the current charging level (State of Charge) and a charging level at a point of charging completion time to be a charging amount for the battery; and charging the battery according to the charging amount based on a charging current rate.

The method charging the battery based on a charging current rate may include changing the charging current rate according to temperature of the battery, and charging the battery based on the changed charging current rate.

The method charging the battery based on a charging current rate may further includes calculating the charging current rate; detecting whether a battery fan of the vehicle is operating; reducing the charging current rate to a first reference rate if the detection result reveals that the battery fan of the vehicle is operating; detecting whether an electric water pump of the vehicle is operating; reducing the charging current rate to a second reference rate if the detection result reveals that the electric water pump is operating; detecting whether a radiator fan of the vehicle is operating; and reducing the charging current rate to a third reference rate if the detection result reveals that the radiator fan of the vehicle is operating.

The method managing the battery may further includes for battery discharging management, setting a difference in energy between the current charging level and a charging level at a point of discharging completion time to be a discharging amount for the battery; and discharging the battery according to the discharging amount based on a discharging current rate.

The method discharging the battery based on a discharging current rate may further includes changing the discharging current rate according to temperature of the battery, and discharging the battery based on the changed discharging current rate.

The method discharging the battery based on a discharging current rate may further includes calculating the discharging current rate; detecting whether a battery fan of the vehicle is operating; reducing the discharging current to a first reference value if the detection result reveals that the battery fan of the vehicle is operating; detecting whether an electric water pump of the vehicle is operating; reducing the discharging current to a second reference value if the detection result reveals that the electric water pump is operating; detecting whether a radiator fan of the vehicle is operating; and reducing the discharging current to a third reference value if the detection result reveals that the radiator fan of the vehicle is operating;

The method managing a state of the battery may further includes for management for leaving the battery, determining whether temperature of the battery is lower than a first reference temperature; determining whether the temperature of the battery exceeds an ambient temperature and a second reference temperature, if it is determined that the temperature of the battery is not lower than the first reference temperature; controlling a battery fan of the vehicle to be activated if it is determined that the temperature of the battery exceeds the ambient temperature and the second reference temperature; determining whether temperature of the battery exceeds the ambient temperature and a third reference temperature; controlling an electric water pump of the vehicle to be activated, if it is determined that the temperature of the battery exceeds the ambient temperature and the third reference temperature; determining whether temperature of the battery exceeds the ambient temperature and a fourth reference temperature; and controlling a radiator fan of the vehicle to be activated if it is determined that the temperature of the battery exceeds the ambient temperature and the fourth reference temperature.

The method for managing a battery for vehicle may further include: if the temperature of the battery is lower than the first reference temperature, controlling the temperature of the battery to rise.

In accordance with one aspect of the present disclosure, a vehicle, includes a communicator configured to perform wired or wireless communication with an external device as well as a power network server and a charging device; a battery configured to be charged and discharged while connected to the charging device; a temperature sensor configured to detect a temperature of the battery and an ambient temperature; and a controller configured to collect and send information about at least one of energy consumption of the battery, the temperature of the battery, and the ambient temperature to the power network server, and manage a condition of the battery according to a battery control signal sent from the power network server.

The vehicle may further includes a battery fan configured to cool down the battery through wind blowing; a radiator fan configured to cool down a radiator through wind blowing; and an electric water pump configured to cool off heat of the battery through circulation of a coolant, wherein the controller may operate at least one of the battery fan, the radiator fan, and the electric water pump according to the battery control signal sent from the power network server.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF ILLUSTRATIVE EMBODIMENTS

Figure 1:
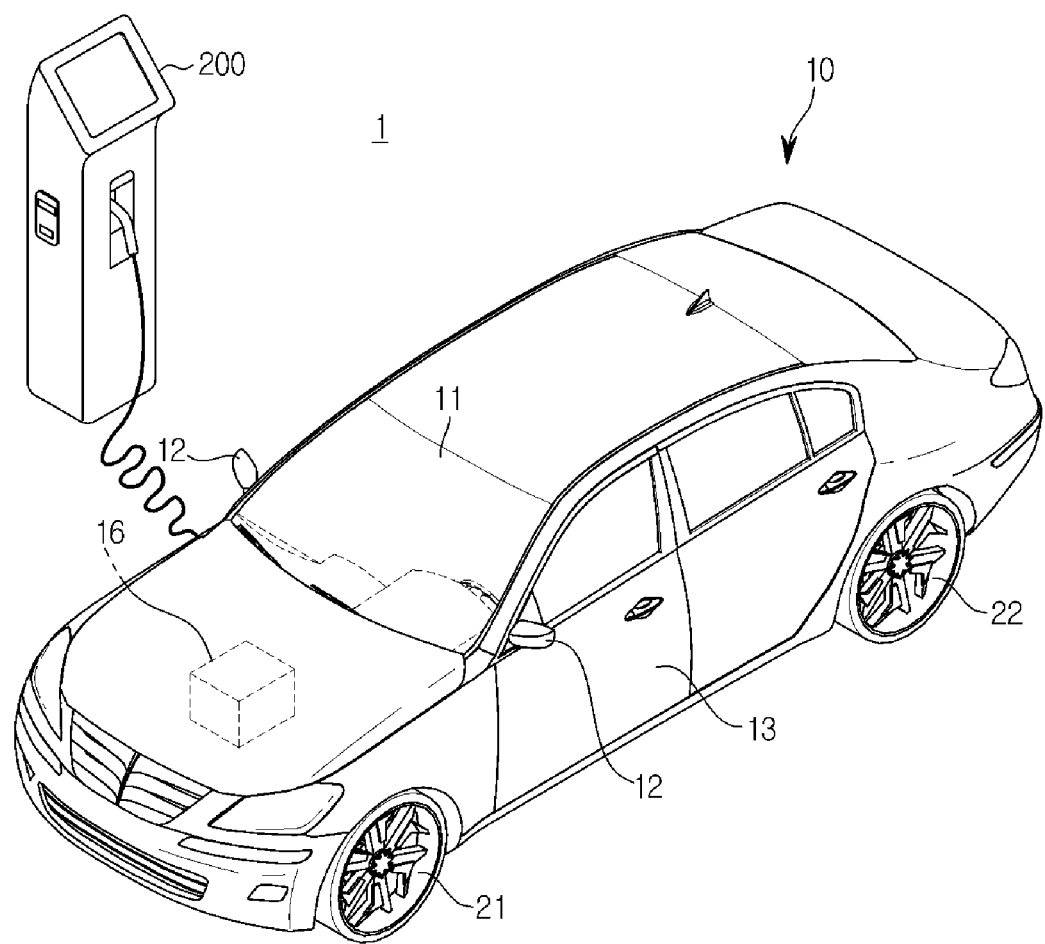
FIG. 1 shows the exterior of a vehicle.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

FIG. 1 shows the exterior of a vehicle.

Referring to FIG. 1, the exterior of a vehicle 1 may include a main body 10 that constitutes the exterior of the vehicle 1, a windscreen 11 for providing views ahead of the vehicle 1 for the driver, side mirrors 12 for helping the driver see views behind the vehicle 1, doors 13 for shielding the interior of the vehicle 1 from outside, and wheels 21 and 22 for moving the vehicle 1 including front wheels 21 located in the front part of the vehicle 1, rear wheels 22 located in the rear part of the vehicle 1.

The windscreen 11 is mounted on the upper front of the main body 10 for allowing the driver to obtain views ahead of the vehicle 1. The side mirrors 12 include a left side mirror and a right side mirror placed on the left and right sides of the main body 10, respectively, for helping the driver obtain views behind and to the sides of the vehicle 1.

The doors 13 may be pivotally attached onto the left and right sides of the main body 10, and opened for the driver and passenger to get on or get off the vehicle 1 and closed for shielding the inside of the vehicle 1 from outside.

In addition to what are described above, the vehicle 1 may include a power system 16 for turning the wheels 21 and 22, a steering system (not shown) for changing moving direction of the vehicle 1, and a braking system (not shown) for stopping the movement of the wheels.

The power system 16 provides turning force to the front or rear wheels 21 or 22 to move the main body 10 forward or backward. The power system 16 may include a motor that produces the turning force from electrical power supplied from a charging battery (not shown) or a combustion engine (not shown) that burns a fuel to create the turning force.

The steering system may include a steering handle 42 (see FIG. 2) manipulated by the driver for controlling driving direction, a steering gear (not shown) for transforming the rotary motion of the steering handle 42 to the reciprocating motion, and a steering link (not shown) for transferring the reciprocating motion of the steering gear to the front wheels 21. The steering system may change the moving direction of the vehicle 1 by changing the direction of the wheel rotation axis.

The braking system may include a brake pedal (not shown) manipulated by the driver for braking operation, a brake drum (not shown) combined with the wheels 21, 22, and a brake shoe (not shown) for braking the rotation of the brake drum. The braking system may brake driving of the vehicle 1 by stopping the rotation of the wheels 21, 22.

The vehicle 1 may be an electric vehicle driven by charging a battery (not shown), and may be connected to a charging device 200 to perform charging, discharging, and leaving the battery. For this, the vehicle 1 and the charging device 200 may be connected to a power network server (not shown) for transmitting control signals to manage the battery through wired or wireless communication.

The power network server will be described later in detail.

In the following description, the vehicle is assumed to be an electric vehicle, for example.

Figure 2:
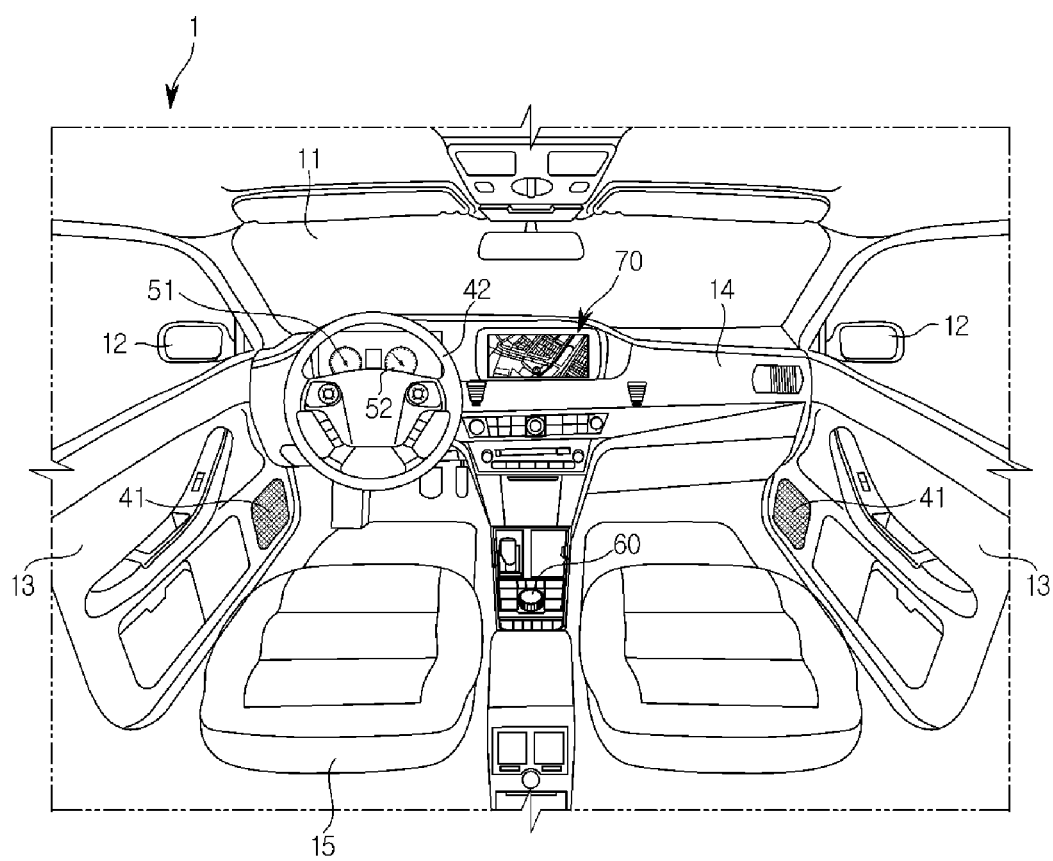
FIG. 2 shows the interior of a vehicle.

FIG. 2 shows the interior of a vehicle.

The interior of the vehicle 1 may include a dashboard 14 on which various systems are installed for the driver to manipulate the vehicle 1, a driver seat 15 seated by the driver, cluster indicators 51, 52 for indicating information about operation of the vehicle 1, and a navigation system 70 for providing not only a route guidance function to give directions but also audio and video functions in response to an instruction from the driver.

The dashboard 14 may be formed to protrude toward the driver from the bottom of the winds screen 11, allowing the driver to manipulate the various systems installed on the dashboard 14 while looking forward.

The driver seat 15 is located opposite the dashboard 14, allowing the driver to drive the vehicle 1 while keeping his/her eye on the road ahead of the vehicle 1 and various systems on the dashboard in a comfortable position.

The cluster indicators 51, 52 may be installed on the dashboard 14 to face the driver seat 15, and may include a speed gage 51 for indicating the current speed of the vehicle 1 and an rpm gage 52 for indicating revolutions per minute of the power system.

The cluster indicators 51, 52 may also indicate a battery charging level, and a battery state, such as charged, discharged, or left alone. The battery state may be indicated on a display of the navigation system 70 or on an extra display equipped in the vehicle 1 as well, apart from the cluster indicators 51, 52.

The navigation system 70 may include a display for displaying information about a road the vehicle 1 is traveling or a route to a destination intended by the driver, and a speaker 41 for producing sound at the control command of the driver. Recently, it is a trend to install an audio video and navigation (AVN) system in which audio and video players and a navigation system are incorporated on the vehicle.

The navigation system 70 may be installed on the center fascia. The center fascia refers to a control panel portion located on the dashboard 14 between the driver and passenger seats, where the dashboard 14 and a shift lever joins in the vertical direction, having the navigation system 70, an air conditioner, a heater controller, a duct, a cigar jack and ash tray, a cup holder, etc., installed therein. The center fascia may also serve to draw a line between the driver seat and the passenger seat along with a center console.

Furthermore, there may be an extra jog dial 60 for manipulating operation of various systems, including the navigation system 70.

In an embodiment of the present disclosure, the jog dial 60 may not only manipulate the operation by being turned or pressed, but may also have a touch recognizable touch pad to recognize handwriting of the user's finger or extra touch-recognizable tool for operation manipulation.

Figure 3:
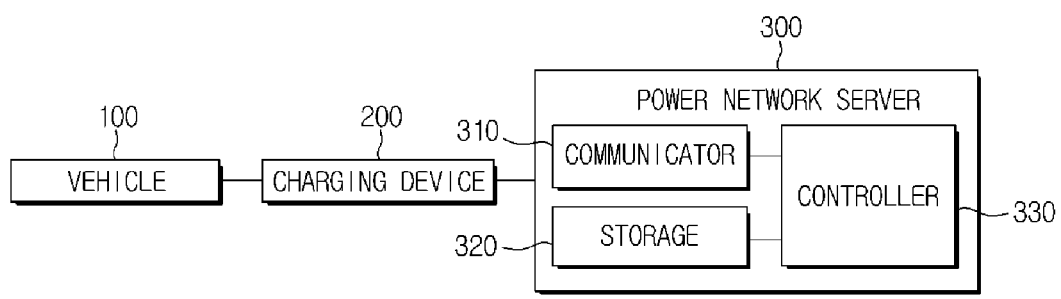
FIG. 3 is a block diagram of a system for managing a battery for vehicle.

FIG. 3 is a block diagram of a system for managing a battery for vehicle.

A system for managing a battery for vehicle will be described along with FIGS. 5 to 8 for explaining a method for managing a battery for vehicle and FIG. 9 for explaining an excessive state of health (SOH) of a vehicle.

Referring to FIG. 3, a system for managing a battery for vehicle may include a vehicle 100 equipped with a rechargeable battery, a charging device 200 for charging the battery of the vehicle 100, and a power network server 300 for communicating with the vehicle 100 or the charging device 200 to collect information about a state of the vehicle 100 and managing the battery based on the collected information.

Although not shown, the power network server 300 may also be connected to a server of the vehicle's manufacturer, the battery's manufacturer, etc., for communication.

The vehicle 100 may send information about energy consumption of the battery and vehicle state to the power network server 300, and control operation of the respective components (e.g., a battery fan, a radiator fan, an electronic water pump (or EWP), a heat riser, etc.) equipped in the vehicle 100 according to battery control signals transmitted from the power network server 300. Detailed configuration of the vehicle 100 will be described later in connection with FIG. 4.

The charging device 200 is a device for charging the battery of the vehicle 100, and may be classified into a quick charging device or a slow charging device depending on a charging time. The quick charging device may be installed where vehicles need to urgently charge their batteries while on the move, such as at gas stations, and the slow charging device may be installed where long-term parking is available, such as in parking lots or shopping malls. Where to install the charging device is not limited thereto, and may be installed at home as well.

The charging device 200 may collect information about energy consumption of the battery and vehicle state from the vehicle 100, transmit the information to the power network server 300, and charge, discharge or leave the battery according to the battery control signals transmitted from the power network server 300, or forward the battery control signals to the vehicle 100.

For this, the charging device 200 may be connected to the vehicle 100 and the power network server (300) through wired or wireless communication.

The vehicle state information may be sent by the vehicle 100 directly to the power network server 300 through the wired or wireless communication, and in response, the power network server 300 may send a battery control signal directly to the vehicle 100.

The power network server 300 may include a communicator 310 for communicating with the vehicle 100 or the charging device 300 to collect the vehicle state information, a storage 320 for storing various information as well as the collected vehicle state information, and a controller 330 for controlling battery management for each vehicle.

Specifically, the controller 330 may collect information about energy consumption of the battery and information about a vehicle state from the vehicle 100, convert an ambient temperature based energy consumption to a reference temperature based learned energy consumption, calculate charging or discharging amount of energy by reflecting the current ambient temperature based on the converted learned energy consumption, set a range of charging or discharging current based on the charging or discharging amount of energy and an extra amount of energy, and manage the battery based on the set range of charging or discharging current.

Referring to the following Table 1, the controller 330 may apply contribution C of an ambient temperature relative to a reference temperature to the ambient temperature based energy consumption E, to convert the energy consumption E to the reference temperature T (e.g., about 23° C.) based learned energy consumption (conversion to temperature T based recent energy consumption [kWh] in Table 1). A formula of the conversion to temperature T based recent energy consumption may be $E*(1+C/100)$. Applying the contribution of the ambient temperature is reflecting the fact that the fuel efficiency of the vehicle rapidly changes by influences of temperature.

The controller 330 may accumulate and store energy consumption delivered from the vehicle 100 as the reference temperature based learned energy consumption.

TABLE 1

| Energy consumption [kWh] | Contribution of ambient temperature relative to temperature T [%] | Conversion to temperature T based recent energy consumption [kWh] |
|---|---|---|
| E | C | $E*(1 + C/100)$ |

Furthermore, the controller 330 may have late-value-weights for the accumulated learned energy consumption, and manage them such that a value has more importance as it is later one.

For example, as shown in Table 2, the controller 330 may convert and learn recent energy consumption calculated through Table 1 to the temperature T based one, and manage the learned energy consumption based on the temperature T by dividing the learned energy consumption into N sample data with weights greater for later values.

Furthermore, the controller 330 may calculate an average energy consumption of a user based on the current ambient temperature to be actually applied by reflecting contribution of the current ambient temperature relative to the reference temperature, when charging or discharging is performed using temperature T based average energy consumption. In other words, charging or discharging amount of energy calculated by the controller 330 reflecting the current ambient temperature may refer to an average energy consumption of a user based on the current ambient temperature.

TABLE 2

| Recent value Weight | Energy consumption (in temperature T based conversion) | Temperature T based average energy consumption | Contribution of current ambient temperature relative to temperature T | Current ambient temperature based average energy consumption of user |
|---|---|---|---|---|
| 1st W1 | TE1 | (W1 * TE1 + W2 * TE2 + . . . + WN * TEN)/ (W1 + W2 + . . . + WN) | Z | (W1 * TE1 + W2 * TE2 + . . . + WN * TEN)/ (W1 + W2 + . . . + WN) * (1 + Z/100) |
| 2nd W2 | TE2 | | | |
| . . . | | | | |
| Nth WN | TEN | | | |

Specifically, the controller 330 may set a difference in energy between the current SOC and a charging level at the time of charging completion to be a charging amount for the battery.

The controller 330 may perform battery charging according to the charging amount, and based on a charging current rate (C rate) of the following equation 1:

Charging current rate (kW)=(energy at charging level at charging completion point of time (kWh)−reserved energy at the current charging level (kWh))/minimum power rate period of time (hour)     (1)

The controller 330 may perform battery charging based on the charging current rate, in which case the controller 330 may change the charging current rate based on the temperature of the battery. Changing the charging current rate is to prevent degradation of the battery due to a rise in temperature of the battery.

The controller 330 may set a difference in energy between the current charging level (SOC) and a charging level at discharging completion point of time (kWh) to be a discharging amount for the battery.

The controller 330 may perform battery discharging according to the discharging amount based on a discharging current rate of the following equation 2:

Discharging current rate (kW)=(reserved energy at current charging level (kWh)−energy at charging level at discharging completion point of time (kWh))/maximum power rate period of time (hour)     (2)

As described above, the power network server 300 may use the energy from the vehicle's battery for another purpose in power peak hours and manage the charging and discharging current rates to recharge the vehicle battery in inexpensive power rate hours, and thus an effect of being able to maximize energy availability may be expected. Although not shown, the power network server 300 may communicate with other systems to use electricity charged in the vehicle battery in the power peak hours for other purposes.

The controller 330 may perform battery discharging based on the discharging current rate, in which case the controller 330 may change the discharging current rate based on the temperature of the battery. Changing the discharging current rate is to prevent degradation of the battery due to a rise in temperature of the battery.

The controller 330 may set a battery charging (or discharging) amount based on the current ambient temperature based average energy consumption of the user managed through the above Tables 1 and 2, and perform charging (or discharging) based on the set battery charging (or discharging) amount by considering the charging (or discharging) current rate.

Figure 5:
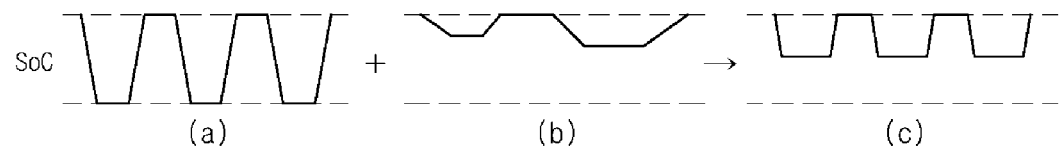
FIGS. 5 to 8 are illustrations for explaining a method for managing a battery for vehicle.

Referring to FIG. 5, in a case of having the maximized charging or discharging energy ratio as in (a), degradation of the battery may grew quicker. In an embodiment of the present disclosure, the power network server 300 may collect an energy consumption pattern like (b), and calculate current ambient temperature based charging or discharging energy like (c).

Figure 6:
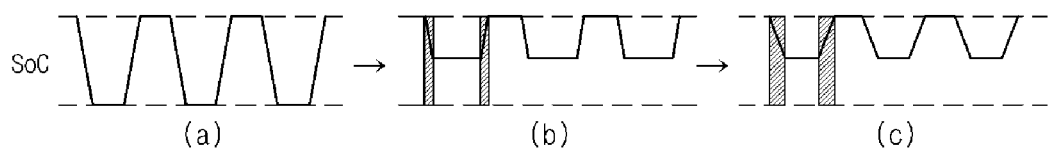
Figure 7:
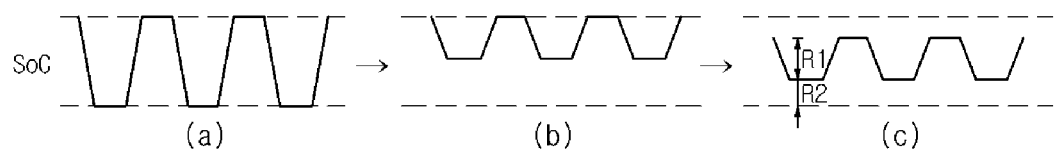

Furthermore, taking into account that as much electricity as the user discharging/charging pattern ((b) of FIG. 5) is required, the power network server 300 may reduce electricity to be supplied during peak hours and thus also reduce the charging current rate as in (c) of FIG. 6.

For example, if an existing scheme for charging 20 kWh for 2 hours is reduced in capacity to 10 kWh, charging will be done in 1 hour. In addition, if the capacity is reduced to 10 kWh while a period of charging time remains as 2 hours, the charging or discharging current decreases by half, thereby preventing a sudden rise in temperature of the battery and expecting a slowdown of degradation.

Batteries of vehicles suffer from degradation due to repetitive charging and discharging, and also degrade even while left alone. Degradation from charging, discharging, and being left has a rate determined by constituents of both poles of the battery. For example, if there are batteries with 90%, 60%, and 30% of SOC, respectively, and the batteries are left alone for the same period of time, the battery with 90% of SOC may degrade at the fastest rate. Batteries are typically charged at midnight and left alone while remaining high SOC until being discharged during the day. Furthermore, car drivers usually use a high SOC range ((b) of FIG. 5). In addition, an average driving mileage a time is rather short, and it is common to almost always charge the vehicle even if the battery is used a little bit. By taking these into account, the power network server 300 manages the SOC range (charging or discharging energy R1+extra energy R2) as shown in (c) of FIG. 7 to slow down the degradation rate. The charging or discharging energy is the average energy consumption required to drive the vehicle under the current ambient temperature, and the extra energy refers to spare energy.

While the battery is being left alone, the controller 330 may control the temperature of the battery of the vehicle to be increased or decreased by comparing the temperature of the battery with at least one of a reference temperature and the ambient temperature.

Specifically, important one of the factors that cause degradation of the battery is the temperature of the battery. The battery has the dullest degradation rate when the battery is under the temperature of 25° C. As shown in (a) of FIG. 8, in a case of keeping charging and discharging the battery, the temperature of the battery may rise to more than 40° C., and if the battery is left alone or used at the temperature of 40° C., it degrades faster. Even in actual conditions used by the user, degradation of the battery may speed up due to the temperature of the battery. The temperature of the battery may fall to a low temperature in the winter season while rising to a high temperature in the summer, and in theses high and low temperature conditions, degradation of the battery speeds up (see (a) of FIG. 8).

Figure 8:
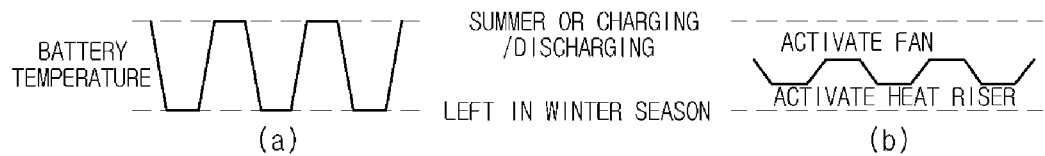
Figure 9:
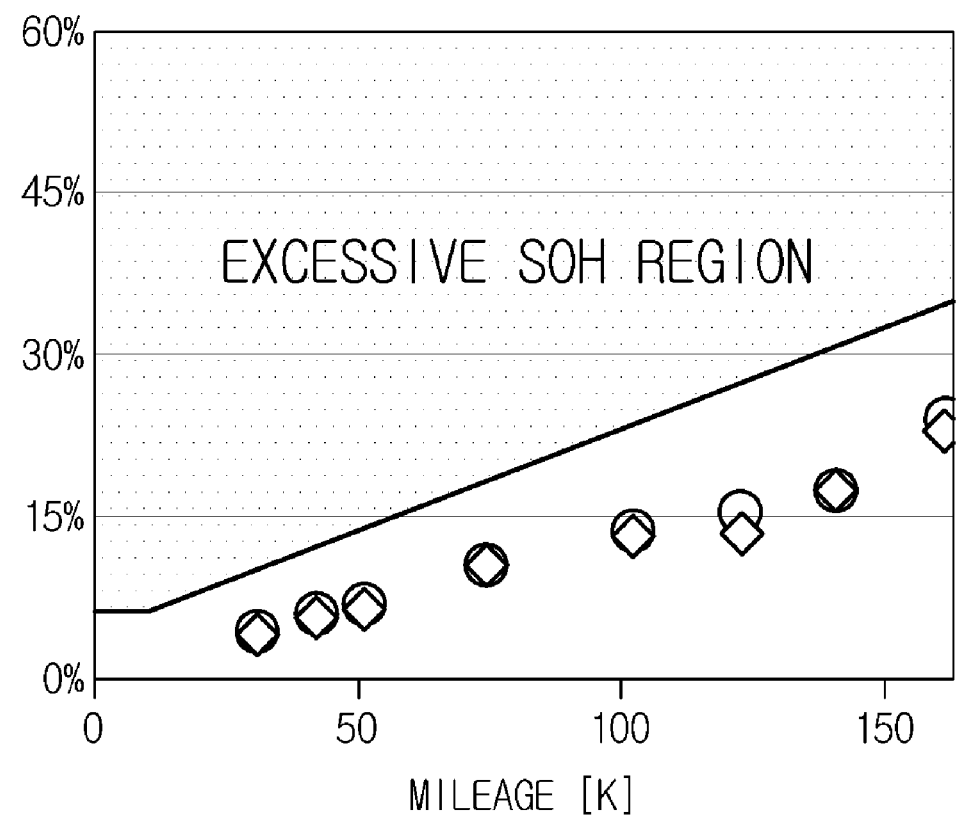
FIG. 9 is a graph for explaining a vehicle's excessive SOH state.

Referring to (b) of FIG. 8, in the present disclosure, the battery temperature is periodically checked, and thus the battery fan, heat riser, and other electric load systems equipped in the vehicle 100 may be controlled to manage the battery temperature, thereby expecting an effect of slowing down the battery degradation.

The power network server 300 may notify a manufacturer (e.g., the battery manufacturer) of a learned value of SOH of the vehicle battery each time battery charging is done. The manufacturer may then send a notification for the vehicle manufacturer and the owner of the vehicle to take follow-up measures for the vehicle that shows degradation corresponding to an excessive SOH area relative to the mileage/production date of the vehicle as shown in FIG. 9.

Figure 4:
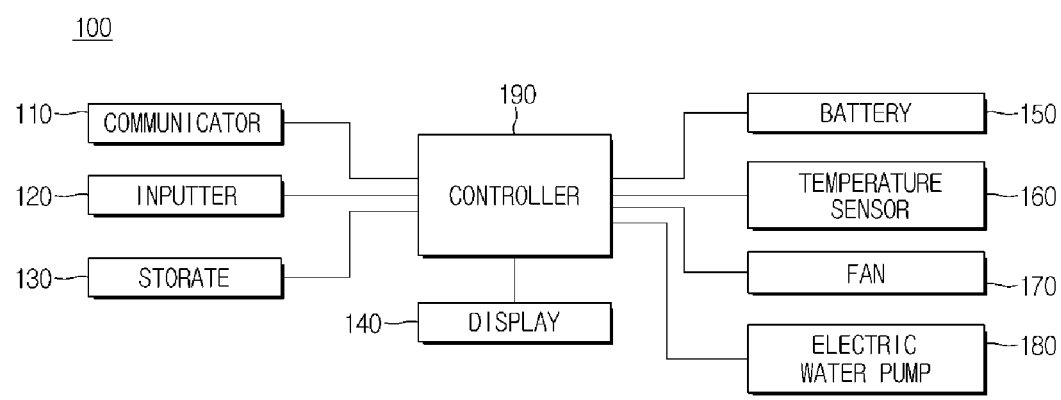
FIG. 4 is a control block diagram of a vehicle.

FIG. 4 is a control block diagram of a vehicle.

Referring to FIG. 4, the vehicle 100 may include a communicator 110, an inputter 120, a storage 130, a display 140, a battery 150, a temperature sensor 160, a fan 170, an electric water pump 180, and a controller 190.

The communicator 110 may perform wired/wireless communication with external devices as well as the power network server 300 and the charging device 200.

The communicator 110 may include one or more components that enable communication with an external device, for example, at least one of a short-range communication module, wired communication module, and wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless communication module for supporting various wireless communication schemes, such as a radio data system-traffic message channel (RDS-TMC), a digital multimedia broadcasting (DMB) module, a wireless fidelity (Wi-Fi) module, and a wireless broadband (Wibro) module, and plus, a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may also include an wireless communication interface with an antenna and receiver for receiving traffic information signals. Furthermore, the wireless communication module may include a traffic information signal conversion module for demodulating a received analog radio signal into a digital control signal through the wireless communication interface.

The inputter 120 may include many different buttons or switches, a pedal, a keyboard, a mouse, a track ball, various levers, a handle, a stick, or some hardware devices for the user input.

The inputter 120 may also include a Graphical User Interface (GUI), i.e., a software device, such as a touch pad for the user input. The touch pad may be implemented with a touch screen panel (TSP), thus forming a interlayer structure with the display 150.

The storage 130 is to store various information regarding the vehicle 100, and may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 130 may be a memory implemented with a chip separate from the aforementioned processor in relation to the controller 190, or may be implemented integrally with the processor in a single chip.

The display 140 is to display various information regarding the vehicle 100, and may include a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, an organic light emitting diode (OLED) panel, etc., without being limited thereto.

The battery 150 may be charged or discharged while connected to the charging device 200. Electricity charged in the battery 150 may be used for motor driving, for example.

The temperature sensor 150 may be for detecting the temperature of the battery 150 and the ambient temperature. Without being limited thereto, the ambient temperature may be detected by the charging device 200 or the power network server 300 instead of the temperature sensor 160 in the vehicle.

The fan 170 is to produce and blow wind, and may include a battery fan to cool down the battery 150 by blowing wind thereto and a radiator fan to cool down the radiator by blowing wind thereto, without being limited thereto.

The electric water pump 180 may be to cool off the heat of the battery 150 through circulation of a coolant.

The controller 190 may collect and send information about at least one of energy consumption of the battery 150, a temperature of the battery 150, and the ambient temperature to the power network server 300, and manage the condition of the battery according to a battery control signal sent from the power network server 300.

Specifically, the controller 190 may operate at least one of the battery fan, radiator fan, an electric water pump 180, and a heat riser (not shown) according to a battery control signal sent from the power network server 300.

The controller 190 may be implemented with a memory (not shown) storing an algorithm to control operation of the components of the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

Figure 10:
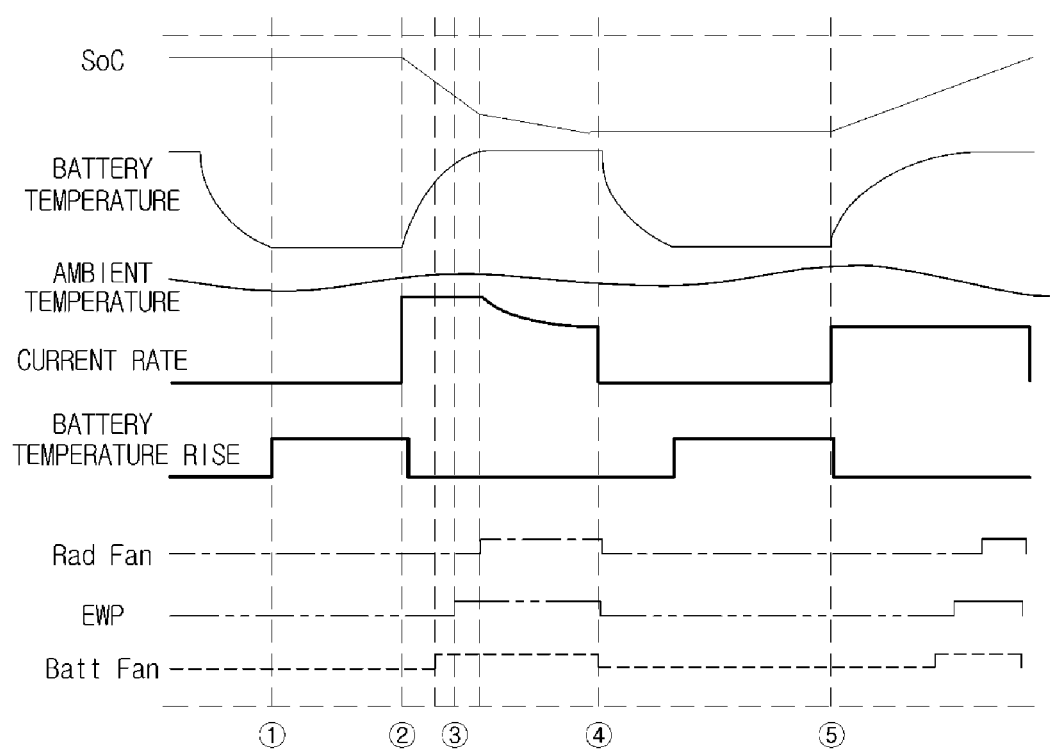
FIG. 10 is illustrations for schematically explaining a method for managing a battery for vehicle.

FIG. 10 is illustrations for schematically explaining a method for managing a battery for vehicle.

In the following description, a method for managing a battery for vehicle will be applied to a case where the vehicle 100 operates a corresponding component according to a battery control signal sent from the power network server 300.

Referring to FIG. 10, ① is a point of time to activate the heat riser to prevent degradation of the battery when the battery temperature falls below a certain level while the battery is left alone (or ready for charging/discharging), ② is a point of time to discharge energy from the battery of the vehicle (in which case, estimation of an amount of the energy is based on learned energy consumption of the user and the ambient temperature) for smart grid utilization in the power peak hours, ③ is a point of time to activate first/second/third logic (BATT FAN, RAD FAN, EWP, etc.) to lower the battery temperature due to a rise in temperature of the battery, ④ is a point of time to leave the vehicle after the battery is discharged, and ⑤ is a point of time to set a current rate across the entire hours of inexpensive power rate (e.g., necessary energy [kWh]/inexpensive power rate hours [hour]). In this regard, since the lower the current rate, the smaller the rise in temperature of the battery in ⑤, durability of the battery is maintained in a good condition and at the same time, the smart grid is available.

Figure 11:
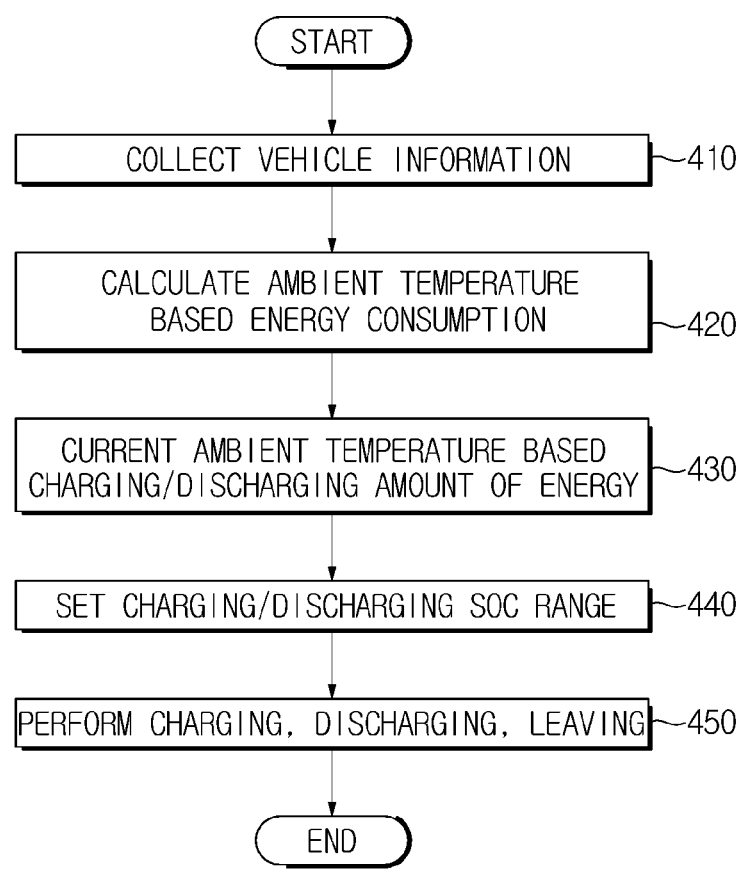
FIG. 11 is a flowchart illustrating a method for managing a battery for vehicle.

FIG. 11 is a flowchart illustrating a method for managing a battery for vehicle.

First, the power network server 300 collects information about a state of the vehicle 100 as well as energy consumption of the battery of the vehicle 100 from the vehicle 100, in 410. In this case, the power network server 300 may collect the vehicle state information directly from the vehicle 100 or from the charging device 200 connected to the vehicle 100. The energy consumption of the battery of the vehicle 100 may be collected after driving of the vehicle 100 is done.

The power network server 300 then converts ambient temperature based energy consumption to a reference temperature based learned energy consumption, in 420.

The power network server 300 then calculates an amount of current ambient temperature based charging or discharging energy based on the learned energy consumption, in 430. The charging or discharging energy may refer to an average energy consumption of the user based on the current ambient temperature.

The power network server 300 then sets a range of charging or discharging current based on the amount of charging or discharging energy and extra energy, in 440.

The power network server 300 manages the battery (e.g., charging, discharging, and leaving the battery) based on the set range of charging or discharging current, in 450.

A method for managing a battery will now be described in more detail with reference to FIGS. 12 to 14, which are flowcharts for explaining some steps of the method for managing the battery for vehicle of FIG. 11 in more detail.

To manage charging of the battery 150, the step 450 of FIG. 11 for managing the battery will be specified as follows:

First, the power network server 300 may set a difference in energy between the current charging level (SOC) and a charging level at a point of charging completion time to be a charging amount for the battery.

The power network server 300 may then charge the battery 150 according to the charging amount, and based on the charging current rate. In this regard, charging the battery 150 may not be performed directly by the power network server 300 but performed by the charging device 200 receiving battery charging control signals from the power network server 300.

Charging the battery 150 based on the charging current rate may further include changing the charging current rate based on the temperature of the battery 150 and charging the battery 150 based on the changed charging current rate.

Figure 12:
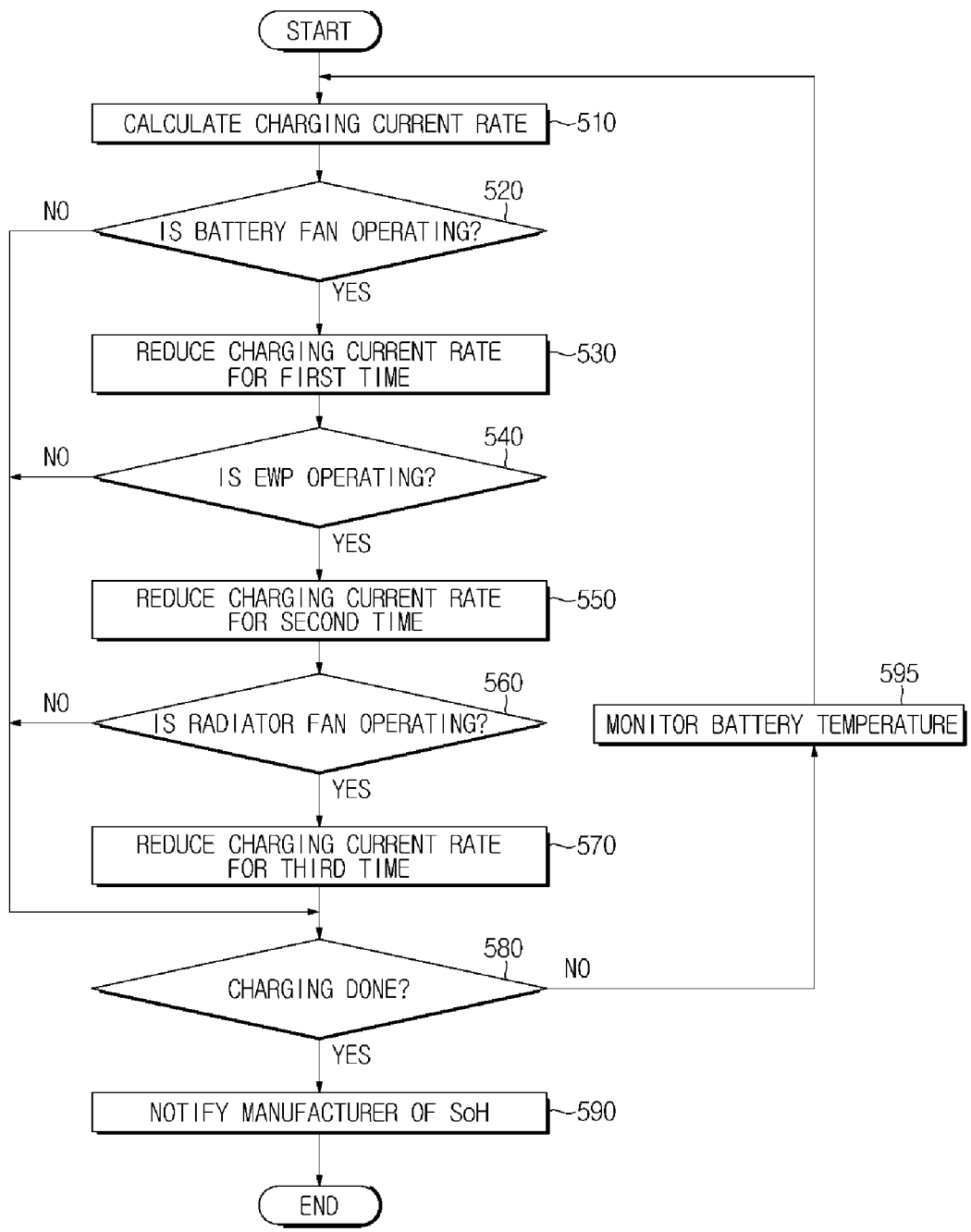
FIGS. 12 to 14 are flowcharts illustrating parts of the method for managing a battery for vehicle of FIG. 11.

Specifically, referring to FIG. 12, the power network server 300 calculates a charging current rate, in 510.

The power network server 300 then detects whether the battery fan of the vehicle 100 is operating, in 520. Whether the battery fan is operating may be detected based on the vehicle state information sent from the vehicle 100, which will also be applied to detecting whether the electric water pump or the radiator fan is operating, as will be described later. The power network server 300 may determine from a result of detecting that the battery fan, EWP, and/or radiator fan is operating that a temperature rises.

If it is determined that the battery fan of the vehicle 100 is operating, the power network server 300 reduces the charging current rate to a first reference rate, in 530. The first reference rate may be about 10%, without being limited thereto.

The power network server 300 then detects whether the electric water pump of the vehicle 100 is operating, in 540.

If it is determined that the electric water pump is operating, the power network server 300 reduces the charging current rate to a second reference rate, in 550. The second reference rate may be about 15%, without being limited thereto.

The power network server 300 then detects whether the radiator fan of the vehicle 100 is operating, in 560.

If it is determined that the radiator fan of the vehicle 100 is operating, the power network server 300 reduces the charging current rate to a third reference rate, in 570. The third reference rate may be about 20%, without being limited thereto. This is to lower the charging current rate to prevent degradation of the battery due to the temperature rise of the battery.

After that, it is determined whether charging of the battery 150 has been completed, in 580.

If it is determined that the battery charging has been done, the power network server 300 sends a state of health (SoH) of the battery to the manufacturer's server (e.g., the battery manufacturer's server, the vehicle manufacturer's server, etc.), in 590.

The vehicle manufacturer refers to a server on the side of manufacturing the vehicle or parts of the vehicle, for receiving the SoH each time the battery is charged or discharged to manage information about e.g., production date/mileage/degradation level of each vehicle.

If the degradation level is excessively significant for the vehicle's production date or relatively high for the mileage, the manufacturer may reduce battery charging or discharging amount and current rate in proportion to the degradation level, or may suggest a way to send a warning of the battery degradation for the user or the manufacturer to check up the vehicle before the degradation would last longer.

If it is determined in 580 that battery charging has not been done, the power network server 300 monitors temperature of the battery, in 595 and repeats the procedure from step 510.

If it is determined in 520, 540, or 560 that the battery fan, the electric water pump, or the radiator fan is not operating, the power network server 300 may perform the process from step 580.

To manage discharging of the battery 150, the step 450 of FIG. 11 for managing a battery will be specified as follows:

First, the power network server 300 may set a difference in energy between the current charging level (SOC) and a charging level at a point of the discharging completion time to be a discharging amount for the battery.

The power network server 300 may then discharge the battery 150 according to the discharging amount, and based on the discharging current rate. In this regard, discharging the battery 150 may not be performed directly by the power network server 300 but performed by the charging device 200 receiving battery discharging control signals from the power network server 300.

Discharging the battery 150 based on the discharging current rate may further include changing the discharging current rate based on the temperature of the battery 150 and discharging the battery 150 based on the changed discharging current rate.

Figure 13:
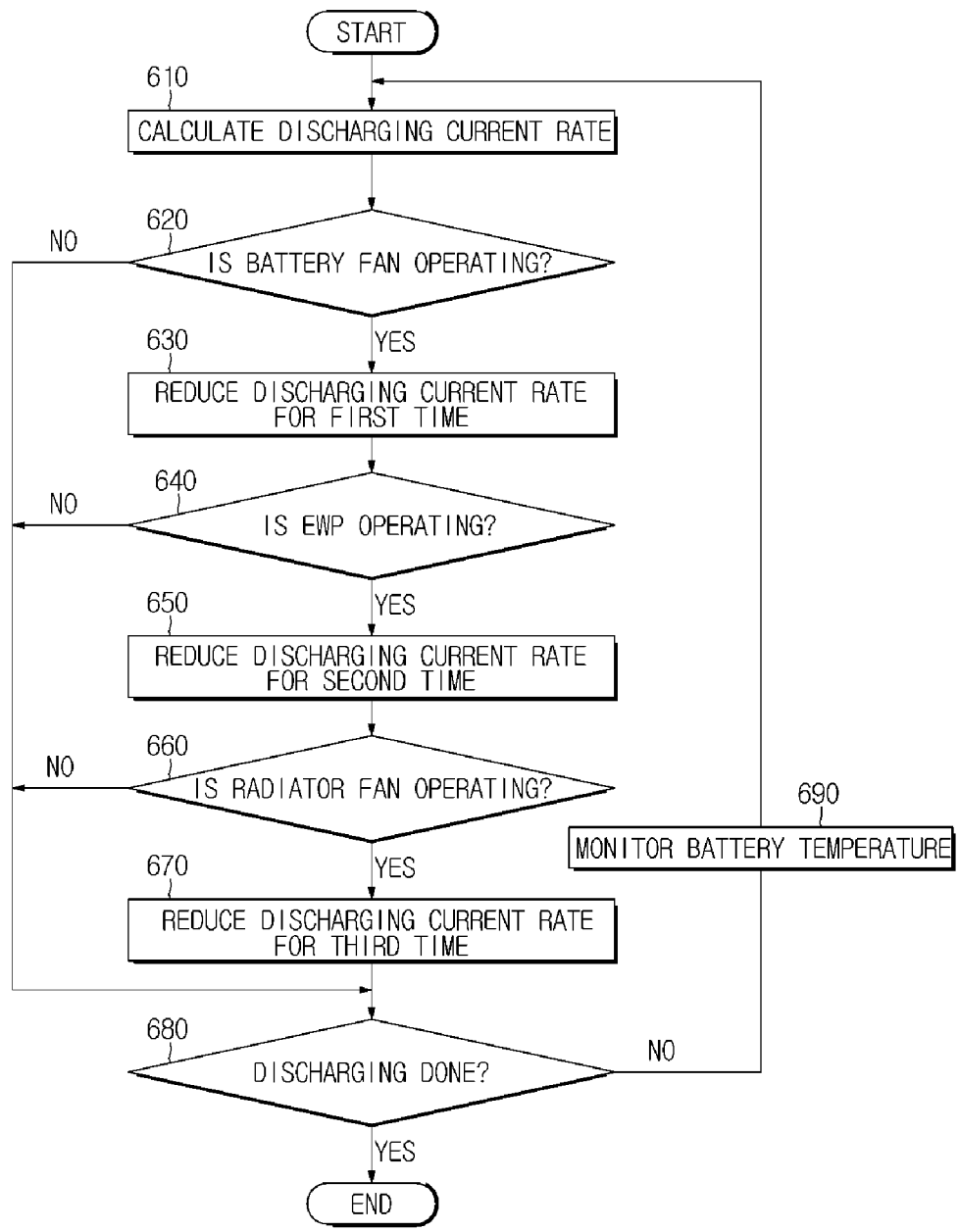

Specifically, referring to FIG. 13, discharging the battery based on the discharging current rate may include calculating a discharging current rate by the power network server 300, in 610.

The power network server 300 then detects whether the battery fan of the vehicle 100 is operating, in 620.

If it is determined that the battery fan of the vehicle 100 is operating, the power network server 300 reduces the discharging current to a first reference rate, in 630. The first reference rate may be about 10%, without being limited thereto.

The power network server 300 then detects whether the electric water pump of the vehicle 100 is operating, in 640.

If it is determined that the electric water pump is operating, the power network server 300 reduces the discharging current to a second reference rate, in 650. The second reference rate may be about 15%, without being limited thereto.

The power network server 300 then detects whether the radiator fan of the vehicle 100 is operating, in 660.

If it is determined that the radiator fan of the vehicle 100 is operating, the power network server 300 reduces the discharging current to a third reference rate, in 670. The third reference rate may be about 20%, without being limited thereto.

After that, it is determined whether discharging of the battery has been completed, and if it is determined that battery discharging has not been done, the power network server 300 monitors temperature of the battery, in 690 and repeats the procedure from step 610.

The aforementioned procedure is to reduce the current rate in an attempt to prevent degradation of the battery due to a rise in temperature of the battery.

If it is determined in 620, 640, or 660 that the battery fan, the electric water pump, or the radiator fan is not operating, the power network server 300 may perform the process from step 680.

Figure 14:
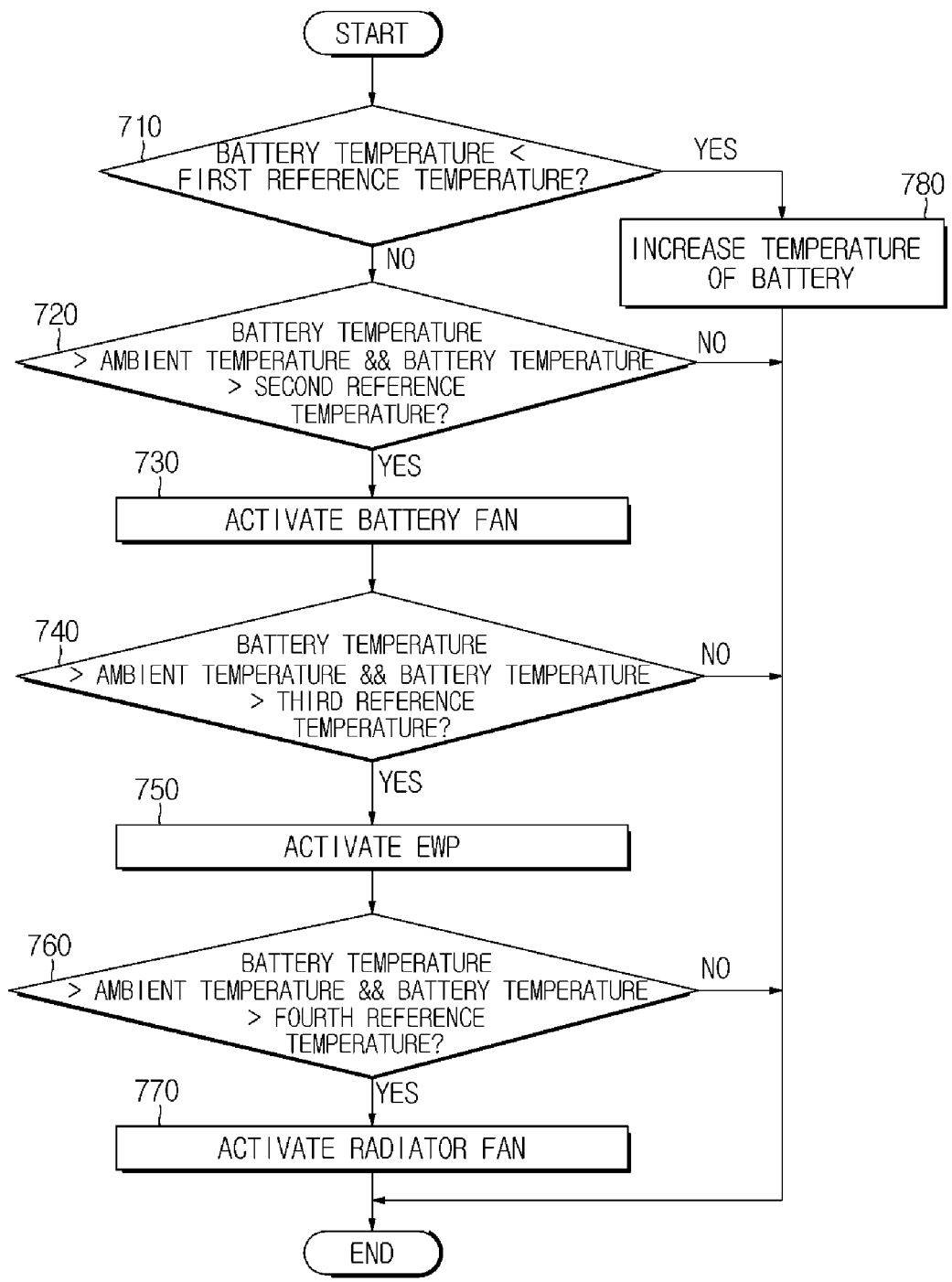

To manage discharging of the battery 150, the step 450 of FIG. 11 for managing a battery will be specified as follows:

Referring to FIG. 14, to manage the state of the battery, the power network server 300 determines whether the temperature of the battery is lower than a first reference temperature, in 710. The first reference temperature may be about 10° C., without being limited thereto.

If it is determined that the temperature of the battery is not lower than the first reference temperature, the power network server 300 determines whether the temperature of the battery exceeds the ambient temperature and a second reference temperature, in 720. The second reference temperature may be about 30° C., without being limited thereto.

If it is determined that the temperature of the battery exceeds the ambient temperature and the second reference temperature, the power network server 300 controls the battery fan of the vehicle to be activated, in 730.

The power network server 300 determines whether the temperature of the battery exceeds the ambient temperature and a third reference temperature, in 740. The third reference temperature may be about 35° C., without being limited thereto.

If it is determined that the temperature of the battery exceeds the ambient temperature and the third reference temperature, the power network server 300 controls the electric water pump of the vehicle to be activated, in 750.

The power network server 300 determines whether the temperature of the battery exceeds the ambient temperature and a fourth reference temperature, in 760. The fourth reference temperature may be about 40° C., without being limited thereto.

If it is determined that the temperature of the battery exceeds the ambient temperature and the fourth reference temperature, the power network server 300 controls the radiator fan of the vehicle to be activated, in 770.

If it is determined in step 710 that the battery temperature is lower than the first reference temperature, the power network server 300 may control the temperature of the battery to rise, in 780.

If it is determined in step 720 that the battery temperature does not exceed the ambient temperature and the second reference temperature; in step 740 that the battery temperature does not exceed the ambient temperature and the third reference temperature; or in step 760 that the battery temperature does not exceed the ambient temperature and the fourth reference temperature, the power network server 300 may stop the procedure.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A system for managing a battery for a vehicle, the system comprising:
    a power network server configured to control discharging of the battery for the vehicle by transmitting energy from the battery of the vehicle to at least one external device in predetermined power peak hours, and wherein the power network server is further configured to control charging of the battery for the vehicle by the at least one external device when an electric power price per hour is lower than a predetermined electric power price; and
    wherein the power network server comprises a controller and a memory storing a program to be executed in the controller, the program comprising instructions for:
        collecting information about energy consumption of the battery and information about a vehicle state from the vehicle,
        converting an ambient temperature based energy consumption to a reference temperature based learned energy consumption,
        calculating a charging or discharging amount of energy by reflecting the current ambient temperature based on the converted learned energy consumption,
        setting a range of charging or discharging current based on the charging or discharging amount of energy and an extra amount of energy, and
        managing the battery based on the set range of charging or discharging current.

2. The system of claim 1, wherein the program comprises further instructions for:

setting a difference in energy between a current charging level (state of charge) and a charging level at a point of charging completion time as a charging amount for the battery.

3. The system of claim 2, wherein the program comprises further instructions for:
performing charging the battery according to the charging amount and based on a charging current rate of the following equation, wherein the equation computes a difference between an energy at charging level at charging completion point of time (kWh) to a reserved energy at the current charging level (kWh) and calculates the charging current rate (kW) as being equal to the computed difference divided by a minimum power rate period of time (hour).

4. The system of claim 3, wherein the program comprises further instructions for:
performing charging of the battery based on the charging current rate, wherein the charging current rate is changed based on temperature of the battery.

5. The system of claim 1, wherein the program comprises further instructions for:
setting a difference in energy between a current charging level and a charging level at a point of discharging completion time as a discharging amount for the battery.

6. The system of claim 5, wherein the program comprises further instructions for:
performing discharging the battery according to the discharging amount and based on a discharging current rate of the following equation, wherein the equation computes a difference between a reserved energy at current charging level (kWh) and an energy at charging level at discharging completion point of time (kWh), and calculates the discharging current rate (kW) as being equal to the computed difference divided by a maximum power rate period of time (hour).

7. The system of claim 6, wherein the program comprises further instructions for:
performing discharging of the battery based on the discharging current rate, wherein the discharging current rate is changed based on temperature of the battery.

8. The system of claim 1, wherein the program comprises further instructions for:
controlling temperature of the battery of the vehicle to be increased or decreased by comparing the temperature of the battery with at least one of a reference temperature and an ambient temperature while the battery is left alone.

9. The system of claim 1, further comprising:
a vehicle configured to send information about energy consumption of the battery and a state of the vehicle to the power network server, and control operation of a corresponding component equipped in the vehicle according to a control signal for the battery sent from the power network server.

10. A method for managing a battery for a vehicle, the method comprising:
controlling discharging of the battery for the vehicle by transmitting energy from the battery to at least one external device in predetermined power peak hours;
controlling charging of the battery for the vehicle by at least one external device when an electric power price per hour is lower than a predetermined electric power price;
wherein the discharging of the battery for the vehicle and the charging of the battery for the vehicle comprises:
collecting information about energy consumption of a battery of the vehicle and information about a vehicle state;
converting ambient temperature based energy consumption to a reference temperature based learned energy consumption;
calculating current ambient temperature based on the charging or the discharging amount of energy based on the converted learned energy consumption;
setting a range of charging or discharging current based on the charging or discharging amount of energy and an extra amount of energy; and
managing the battery based on the set range of charging or discharging current.

11. The method of claim 10, wherein managing the battery comprises
setting a difference in energy between the current charging level (State of Charge) and a charging level at a point of charging completion time to be a charging amount for the battery; and
charging the battery according to the charging amount based on a charging current rate.

12. The method of claim 11, wherein charging the battery based on the charging current rate comprises
changing the charging current rate according to temperature of the battery, and charging the battery based on the changed charging current rate.

13. The method of claim 11, wherein charging the battery based on the charging current rate comprises
calculating the charging current rate;
detecting whether a battery fan of the vehicle is operating;
reducing the charging current rate to a first reference rate in response to detecting that the battery fan of the vehicle is operating;
detecting whether an electric water pump of the vehicle is operating;
reducing the charging current rate to a second reference rate in response to detecting that the electric water pump is operating;
detecting whether a radiator fan of the vehicle is operating; and
reducing the charging current rate to a third reference rate in response to detecting that the radiator fan of the vehicle is operating.

14. The method of claim 10, wherein managing the battery comprises
setting a difference in energy between the current charging level and a charging level at a point of discharging completion time to be a discharging amount for the battery; and
discharging the battery according to the discharging amount based on a discharging current rate.

15. The method of claim 14, wherein discharging the battery based on the discharging current rate comprises
changing the discharging current rate according to temperature of the battery, and discharging the battery based on the changed discharging current rate.

16. The method of claim 14, wherein discharging the battery based on the discharging current rate comprises
calculating the discharging current rate;
detecting whether a battery fan of the vehicle is operating;
reducing the discharging current to a first reference value in response to detecting that the battery fan of the vehicle is operating;
detecting whether an electric water pump of the vehicle is operating;

reducing the discharging current to a second reference value in response to detecting that the electric water pump is operating;
detecting whether a radiator fan of the vehicle is operating; and
reducing the discharging current to a third reference value in response to detecting that the radiator fan of the vehicle is operating.

17. The method of claim 10, wherein managing the state of the battery comprises
determining whether temperature of the battery is lower than a first reference temperature;
determining whether the temperature of the battery exceeds an ambient temperature and a second reference temperature, in response to determining that the temperature of the battery is not lower than the first reference temperature;
controlling a battery fan of the vehicle to be activated if it is determined that the temperature of the battery exceeds the ambient temperature and the second reference temperature;
determining whether temperature of the battery exceeds the ambient temperature and a third reference temperature;
controlling an electric water pump of the vehicle to be activated, if it is determined that the temperature of the battery exceeds the ambient temperature and the third reference temperature;
determining whether temperature of the battery exceeds the ambient temperature and a fourth reference temperature; and
controlling a radiator fan of the vehicle to be activated if it is determined that the temperature of the battery exceeds the ambient temperature and the fourth reference temperature.

18. The method of claim 17, further comprising:
in response to determining that the temperature of the battery is lower than a first reference temperature, controlling the temperature of the battery to rise.

19. A vehicle comprising:
a communicator configured to perform wired or wireless communication with an external device as well as a power network server and a charging device;
a battery configured to be charged and discharged while connected to the charging device;
a temperature sensor configured to detect a temperature of the battery and an ambient temperature; and
a controller configured to
control discharging of the battery by transmitting energy from the battery to the external device during predetermined power peak hours, and
control charging of the battery when an electric power price per hour is lower than a predetermined electric power price,
wherein the controller configured to collect and send information about at least one of energy consumption of the battery, the temperature of the battery, and the ambient temperature to the power network server, and manage a condition of the battery according to a battery control signal sent from the power network server.

20. The vehicle of claim 19, further comprising:
a battery fan configured to cool down the battery through wind blowing;
a radiator fan configured to cool down a radiator through wind blowing; and
an electric water pump configured to cool off heat of the battery through circulation of a coolant, wherein the controller is configured to operate at least one of the battery fan, the radiator fan, and the electric water pump according to the battery control signal sent from the power network server.

* * * * *